(12) United States Patent
Westhoff

(10) Patent No.: US 7,073,740 B2
(45) Date of Patent: Jul. 11, 2006

(54) MOTORIZED FISHING REEL ACTUATING MECHANISM AND ROD ASSEMBLY

(76) Inventor: Bryan E. Westhoff, 2722 Neier Rd., Beaufort, MO (US) 63013

( * ) Notice: Subject to any disclaimer, the term of this patent is extended or adjusted under 35 U.S.C. 154(b) by 76 days.

(21) Appl. No.: 10/962,654

(22) Filed: Oct. 13, 2004

(65) Prior Publication Data

US 2006/0076444 A1    Apr. 13, 2006

(51) Int. Cl.
*A01K 89/01* (2006.01)
(52) U.S. Cl. .......................... 242/225; 242/323; 43/20; 43/21
(58) Field of Classification Search ................ 242/223, 242/225, 226, 323; 43/20, 21
See application file for complete search history.

(56) References Cited

U.S. PATENT DOCUMENTS

| | | | | |
|---|---|---|---|---|
| 2,100,428 A * | 11/1937 | Bond | | 43/20 |
| 2,153,250 A * | 4/1939 | Howe | | 43/20 |
| 2,776,515 A * | 1/1957 | Lynch | | 242/225 |
| 2,836,921 A * | 6/1958 | Lynch | | 242/225 |
| 2,863,251 A * | 12/1958 | Ackerman | | 43/17 |
| 2,896,875 A * | 7/1959 | Reed et al. | | 242/225 |
| 3,052,424 A * | 9/1962 | Skraban | | 242/226 |
| 3,064,385 A * | 11/1962 | Pickard | | 42/21 |
| 3,252,239 A * | 5/1966 | Moeller | | 43/21 |
| 3,348,788 A * | 10/1967 | Vinokur | | 242/225 |
| 3,405,473 A * | 10/1968 | Boussageon | | 43/21 |
| 3,411,230 A * | 11/1968 | Hopper | | 242/225 |
| 3,463,415 A * | 8/1969 | Lingle | | 242/225 |
| 3,544,030 A * | 12/1970 | Daniels | | 242/225 |
| 3,688,456 A * | 9/1972 | Igwe et al. | | 52/121 |
| 3,823,502 A * | 7/1974 | Countryman | | 43/20 |
| 4,175,716 A | 11/1979 | Reichow | | |
| 4,515,324 A | 5/1985 | Barton | | |
| 4,529,112 A | 7/1985 | Miller | | |
| 4,559,735 A | 12/1985 | Batick, Jr. | | |
| 4,598,878 A | 7/1986 | Steffan | | |
| 4,627,188 A * | 12/1986 | Razote | | 43/21 |
| 4,634,072 A * | 1/1987 | Stealy | | 242/225 |
| 4,739,944 A | 4/1988 | Atwell | | |
| 5,004,181 A * | 4/1991 | Fowles | | 242/225 |
| 5,042,188 A * | 8/1991 | Ho | | 43/21 |
| 5,443,218 A | 8/1995 | Ciocca | | |
| 5,695,140 A | 12/1997 | Goodman | | |
| 5,878,523 A * | 3/1999 | Wenzel | | 43/21 |
| 6,003,746 A | 12/1999 | Richardson | | |
| 6,056,219 A * | 5/2000 | Barkley | | 242/225 |
| 6,126,104 A * | 10/2000 | Kellerman | | 242/225 |
| 6,141,898 A | 11/2000 | Shelton | | |
| 6,318,653 B1 * | 11/2001 | Dobbins | | 242/225 |
| 6,449,895 B1 * | 9/2002 | Zabihi | | 43/21 |
| 6,880,775 B1 * | 4/2005 | Wenzel | | 242/225 |
| 2005/0087638 A1 * | 4/2005 | Wenzel | | 242/225 |

* cited by examiner

*Primary Examiner*—Emmanuel M Marcelo
(74) *Attorney, Agent, or Firm*—Richard C. Litman

(57) ABSTRACT

A motorized fishing reel actuating mechanism and rod assembly includes a support housing having a rod and reel member and a mounting member extending perpendicularly from the rod and reel member. A fishing rod is joined to and extends forwardly from a sleeve disposed in the support housing. An elongated handle is mounted a gear housing and extends rearward with respect to the support housing. An electrical motor is disposed inside the elongated handle. A power source is operatively coupled to the electrical motor and a drive train is operatively coupled to the electrical motor. A gear assembly is operatively coupled to the drive train and the fishing reel for winding a fishing line thereupon. A switch assembly includes a variable control mechanism and an elongated lever arm pivotally connected to the switch assembly. The variable control mechanism varies the speed of the electrical motor.

20 Claims, 7 Drawing Sheets

MOTORIZED FISHING REEL ACTUATING MECHANISM AND ROD ASSEMBLY

BACKGROUND OF THE INVENTION

1. Field of the Invention

The present invention relates generally to fishing reels, and more particularly to a motorized fishing reel actuating mechanism and rod assembly for selectively actuating an associated fishing reel.

2. Description of the Related Art

A typical fishing reel normally includes a spool upon which the fishing line is wound. A hand crank is usually located on one end of the reel body or frame, and is connected to the spool by a spool shaft. When the hand crank is rotated, the fishing line is wound onto the spool of the fishing reel. Normally, to operate the fishing reel requires the use of both hands. One hand holds the fishing rod while the other hand rotates the hand crank. This two-handed operation can present problems to certain individuals who would normally enjoy fishing but for a variety of health reasons, such as arthritis or other health elements, find it difficult to operate the hand crank. In addition, for those individuals who may have limited mobility in one arm or only have one hand available to operate the fishing reel, the task of operating the hand crank may become so difficult that the individual cannot enjoy the fishing experience.

Even when an individual resorts to using a motorized fishing reel, some of these types of fishing reels are not conducive for single hand operation, and others have electrical switches that may be difficult to operate with one hand. Still other motorized reel structures are hard to balance or hold in one hand while fishing. For example, while casting out the fishing line or winding the fishing line onto the reel. Furthermore, some motorized fishing reels may no suit the individual's preference or may not be suited for a particular fishing condition or environment. For example, most individuals would enjoy the freedom of using their own fishing reel while fishing, and would further enjoy being able to change or swap out fishing reels on the fishing rod.

Accordingly, there is a need for a motorized fishing reel actuating mechanism and rod assembly, which is adaptable for retrofit to any type of fishing reel. Additionally, there is a need for a motorized fishing reel actuating mechanism and rod assembly, which has a spool shaft adaptor that attaches to the spool shaft by removing the hand crank and attaching the spool shaft adaptor thereon. Furthermore, there is a need for a motorized fishing reel actuating mechanism and rod assembly, which is configured for good balance during single hand operation and has an actuating switch that can be easily engaged and disengaged to operate the fishing reel. Thus, a motorized fishing reel actuating mechanism and rod assembly solving the aforementioned problems is desired.

SUMMARY OF THE INVENTION

The motorized fishing reel actuating mechanism and rod assembly for selectively actuating an associated fishing reel is configured to operatively couple to an existing fishing reel mounted to the fishing rod. The fishing rod is designed and configured to house the fishing reel actuating mechanism and power source that energize the fishing reel actuating mechanism, upon which the fishing reel actuating mechanism rotates the spool of the fishing reel for winding the fishing line thereon.

The motorized fishing reel actuating mechanism and rod assembly includes a support housing having a rod and reel member for mounting a fishing reel thereon and a mounting member, which is integrally connected to and extends perpendicularly from a side portion of the rod and reel member. A fishing rod is joined to a sleeve disposed in the rod and reel member and extends forwardly from the support housing.

An elongated handle is mounted a gear housing and extends rearward with respect to the support housing. The elongated handle has a periphery wall with opposing first and second end portions. The periphery wall defines a generally cylindrical chamber therein. An electrical motor is disposed inside the elongated handle. A power source is operatively coupled to the electrical motor and a drive train is operatively coupled to the electrical motor.

A gear assembly is mounted to and is operatively coupled to the drive train and the fishing reel for winding a fishing line thereupon. A switch assembly includes a variable control mechanism and an elongated lever arm pivotally connected by a pin to the switch assembly. The variable control mechanism is in electrical communication with the power source and the electrical motor for varying the speed of the electrical motor. The variable control mechanism is operatively engage and disengage by an elongated lever, wherein the electrical motor rotates the gear assembly, and rotation of the gear assembly operatively rotates a spool of the fishing reel for winding a fishing line thereon.

Accordingly, the motorized fishing reel actuating mechanism and rod assembly is adaptable to operatively couple to any type of fishing reel. Additionally, the motorized fishing reel actuating mechanism and rod assembly has a spool shaft adaptor, which is configured to connect with any type of spool shaft by removing the hand crank and coupling the spool shaft adaptor thereon. Moreover, the motorized fishing reel actuating mechanism and rod assembly is configured for good balance during single hand operation and has an actuating switch, which can be easily engaged and disengaged to operate the fishing reel.

These and other advantages of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
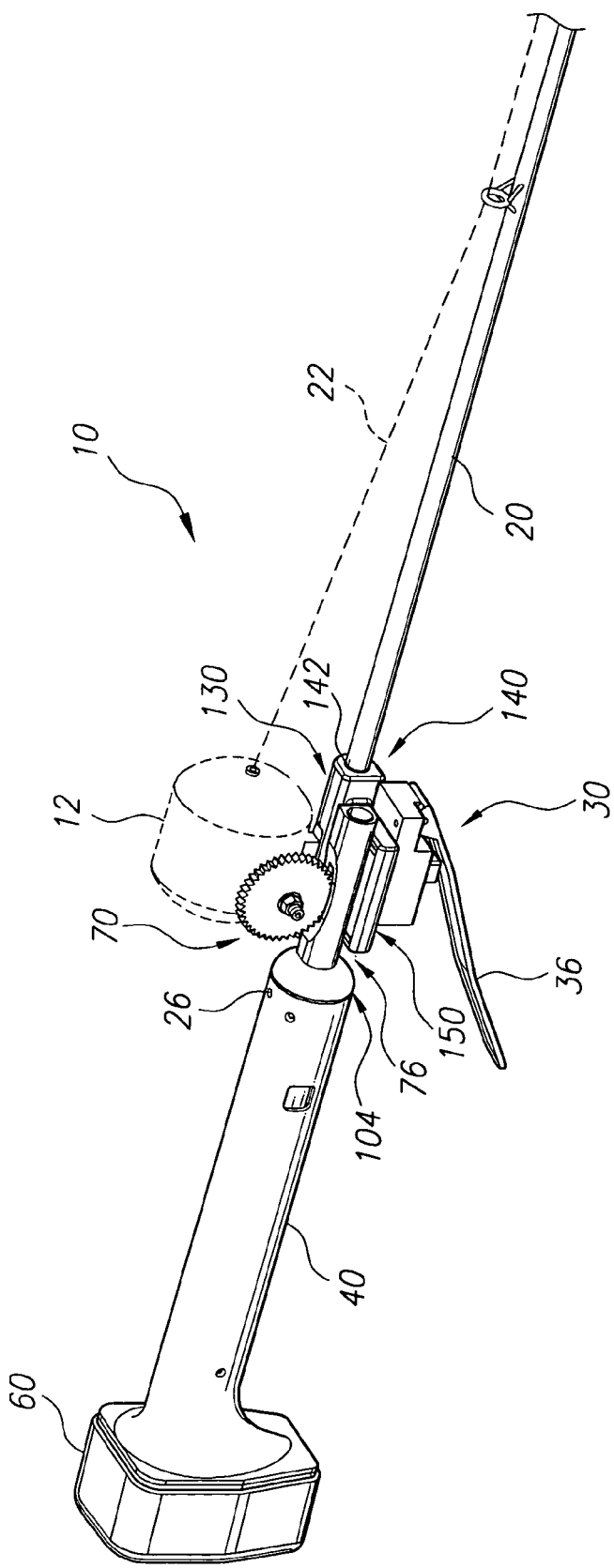
FIG. 1 is a right perspective view of a motorized fishing reel actuating mechanism and rod assembly according to the present invention.
Figure 2:
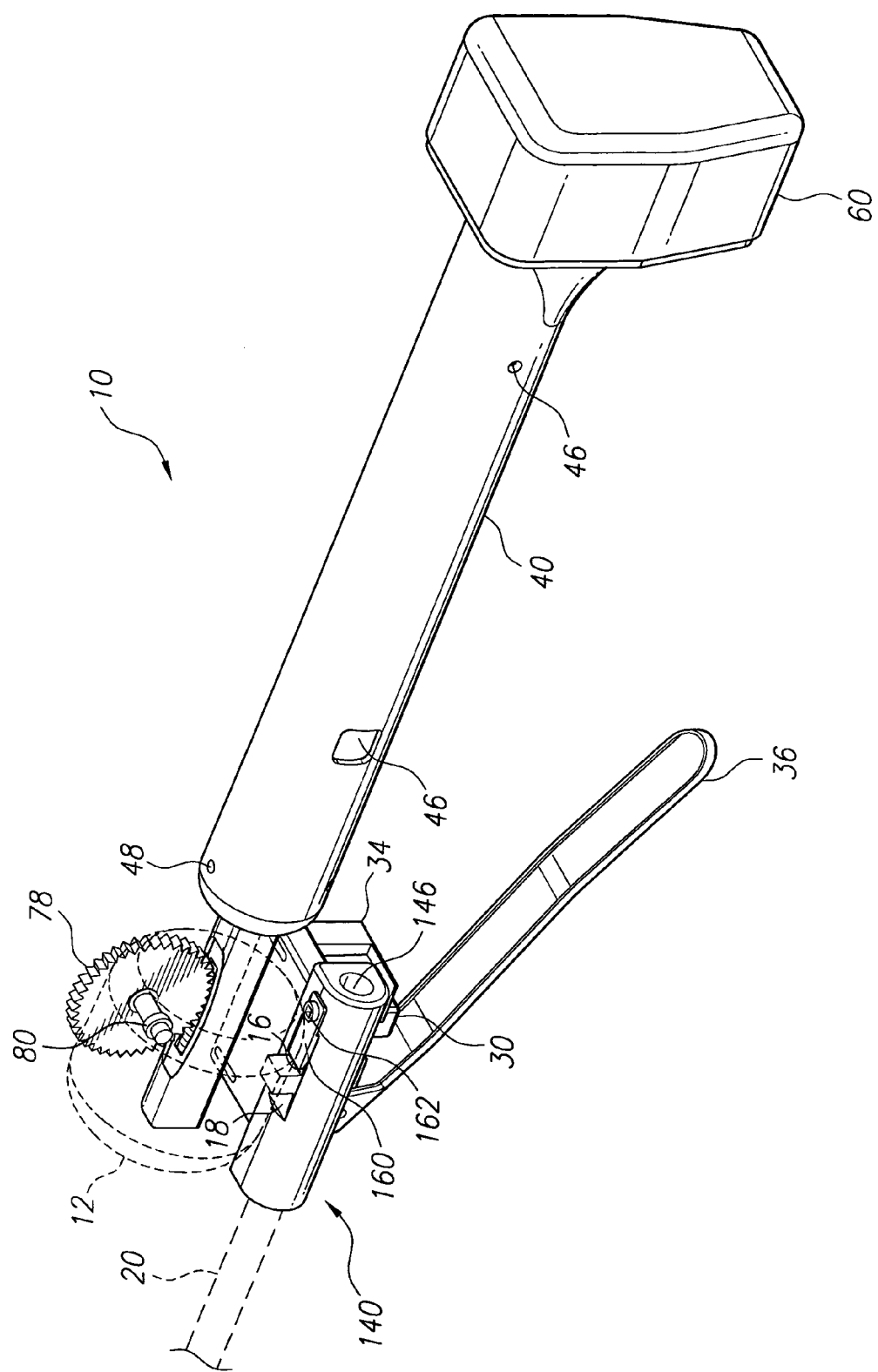
FIG. 2 is a left perspective a motorized fishing reel actuating mechanism and rod assembly according to the present invention.

Referring to FIGS. 1 and 2, a motorized fishing reel actuating mechanism and rod assembly, generally indicated at 10, of this present invention includes an elongated handle 40 removably connected to a gear housing 90. The elongated handle 40 includes a power source 60, such as battery, operatively coupled to an electrical motor 50 disposed inside the elongated handle 40. The power source 60 is preferably a rechargeable battery. The gear housing 90 is removably mounted to a support housing 130. The support housing 130 includes a rod and reel member 140 and a mounting member 150. The mounting member 150 is integrally connected to the rod and reel member 140 and extends perpendicularly from a side portion of the rod and reel member 140. The mounting member 150 defines a platform or deck for mounting a drive train thereon 76.

A fishing rod 20 is mounted within a sleeve 146 of the rod and reel member 140 and extends forwardly from the support housing 130. The fishing rod 20, the support housing 130, and the elongated handle 40 define a fishing pole, which is adapted for mounting an existing fishing reel thereon.

The gear housing 90 has a drive train 76 disposed therein, which is operatively coupled to the electrical motor 50, as describe below. A gear assembly 70 is operatively coupled to the drive train 76 and an associated fishing reel 12, so that the electrical motor 50 rotates the gear assembly 70, which operatively rotates the spool shaft 14 that winds the fishing line 22 onto the spool of the fishing reel 12.

The fishing reel 12 can be any conventional fishing reel having a spool shaft 14 coupled to a hand crank (not shown) for winding a fishing line 22 thereon. The hand crank is unfastened from the spool shaft 14 to expose the threaded portion of the spool shaft 14, which extends outwardly from the body of the fishing reel 12. The gear assembly 70 is operatively coupled to the spool shaft 14 by a spool shaft adaptor 80, as described below.

A switch assembly 30 is connected to the bottom side of the mounting member 150. The switch assembly 30 has a variable speed control mechanism 32, such as an electrical switch or trigger. The electrical switch 32 is in electrical communication with the battery 60 and the electrical motor 50. The electrical switch 32 varies the speed of the electrical motor 50, which results in varying the rotational speed of fishing line spool of the fishing reel 12. An elongated lever arm 36 is pivotally connected to forward portion of the switch assembly 30 and extends along the bottom side of the elongated handle 40 towards the battery 60, so that a person's hand can selectively engage and disengage the elongated lever arm 36, which in turn operatively engages and disengages the electrical switch 32.

Figure 3:
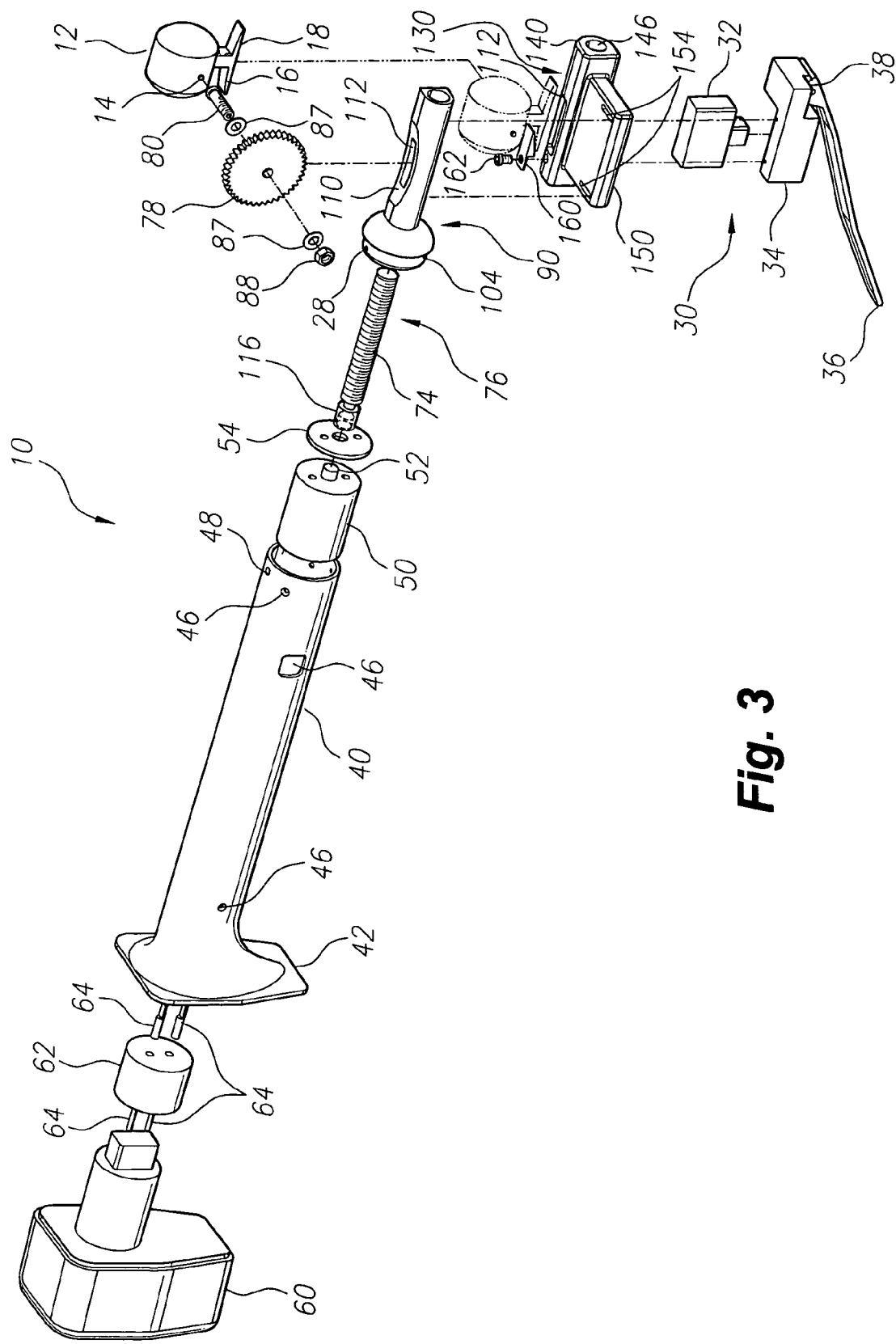
FIG. 3 is an exploded view of a motorized fishing reel actuating mechanism and rod assembly according to the present invention.

As shown in FIG. 3, the rod and reel member 140 and the mounting member 150, which is integrally connected to and extends perpendicularly from the side portion of the rod and reel member 140, define the support housing 130. The support housing 130 is designed and configured to position the fishing rod 20 and reel 12 in a generally co-planer orientation with respect to each other and to orientate the elongated handle 40 in a generally offset position with respect to the rod and reel member 140. The elongated handle 40 extends rearwardly from the support housing in a generally parallel plane with respect to the fishing rod 20. Advantageously, this type of arrangement provides a relatively good balance for casting and winding the fishing line 22 with one hand. Alternatively, the elongated handle 40 can be positioned in a co-planer orientation with respect to the fishing rod 20.

Referring to FIGS. 3, 4, 5A–5D, the mounting member 150 includes adjustment holes, or slots, 154 that allow the gear housing 90 to be mounted thereon and adjusted, so that first gear 74, which is co-axially connected to the drive train 76, is in alignment with second gear 78 for rotation therewith. The gear housing 90 is connected to the mounting member 150 by fasteners that are secured to internally threaded holes 28 disposed on the bottom of the gear housing 90. The drive train 76 extends axially inside the gear housing 90 and is coupled to a motor shaft 52 of the electrical motor 50 by a coupling 116. The coupling 116 is press-fitted onto the motor shaft 52 and a pin 118 is inserted into the throughhole of the coupling 116 to secure the drive train 76 to the motor shaft 52.

The elongated handle 40 includes a periphery wall having opposing first and second end portions 42 and 44. The periphery wall is configured to define a generally cylindrical chamber therein. A portion of the interior surface of the periphery wall has slots or grooves, which define passageways, conduits, or channels for electrical wires 66 to run through. The second end portion 44 is configured to receive coupling 104, which is integrally connected to the gear housing 90.

The electrical motor 50 includes a motor shaft 52 and a motor mounting plate 54. The motor mounting plate 54 mounts the electrical motor 50 inside the second end portion 44 of the elongated handle 40. Holes 48, which are preferably countersink, are disposed on the second end portion 44 of the elongated handle 40 and are positioned for alignment with threaded holes 28, which are disposed on the coupling 104. A plurality of fasteners are used to secure the motor mounting plate 54 and the gear housing 90 to the elongated handle 40. The fasteners can be screws or bolts. Preferably, the fasteners used are flat head screws. The fasteners are inserted into countersink holes 48 and mounted to the internal threads of holes 28 of the coupling 104. Alternatively, the fasteners can be rivets, dowels, pins, or keys.

The first end portion 42 of the elongated handle 40 is configured to receive a portion of the battery 60. The battery 40 is removably mounted to the first end portion 42 of said elongated handle 40. The battery 60 and elongated handle 40 define the base of the fishing pole 20, which can be positioned on the leg or hip for additional support while casting and winding the fishing line 22 from the fishing reel 12. The battery 60 connects to an electrical plug, socket, or connector 62, which is disposed within the elongated handle 40. The elongated handle 40 includes a plurality of ventilation holes 46, which allow heat to dissipate from the elongated handle 40 during the winding operation of the fishing reel 12.

Figure 6:
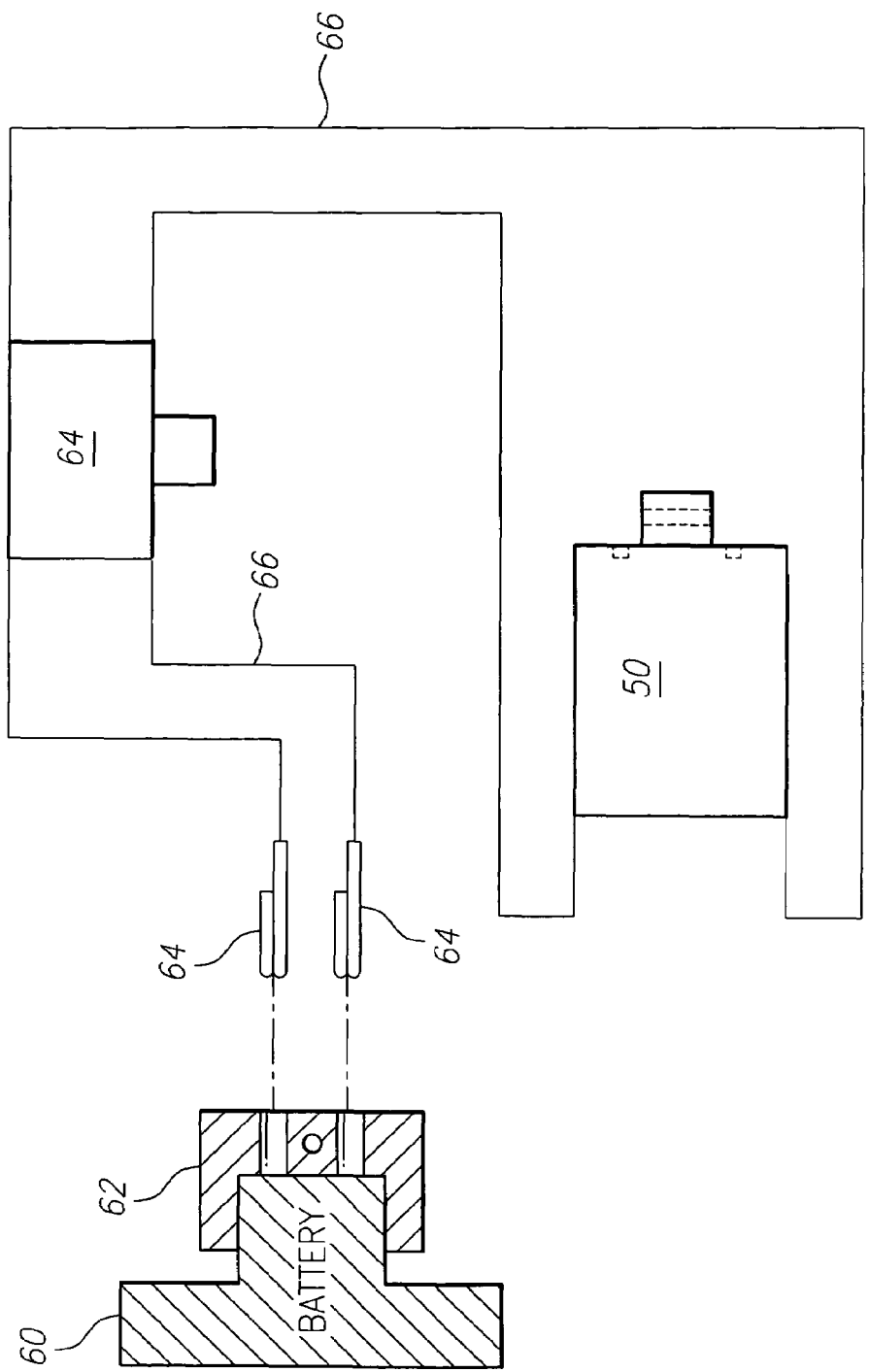
FIG. 6 is a schematic view illustrating the arrangement of the electrical system of the motorized fishing reel actuating mechanism and rod assembly according to the present invention.

As shown in FIGS. 3 and 6, the battery 60 is connected to the electrical connector, plug, or socket, 62 by means of electrical connections 64, such as electrical connectors, electrical leads, or electrical contacts. Electrical wires 66 are joined to the electrical plug 62. The battery 60 is operatively coupled to the electrical motor 50 by electrical wires 66. The electrical switch 32 is interposed between the batter 40 and the electrical motor 50 and is in electrical communication thereof by means of electrical wires 66. The electrical switch 32 is a variable control switch, or resistance switch, which varies the speed of the electrical motor 50.

Referring to FIGS. 3 and 5A–5D, the electrical switch 32 is configured to partially fit within the recessed cavity 152 of the platform 150, so that the actuating portion of the electrical switch extends downwardly towards the elongated lever arm 36 for engagement thereof. The switch assembly 30 also includes a switch mounting bracket 34, which is configured to supportively mount and hold the electrical switch 32 inside the recessed cavity 152 of the platform 150. The switch mounting bracket 34 has a generally L-shape configuration and is mounted to the platform 150 by fasteners, which are secured to internally threaded holes 28. When switch mounting bracket 34 is mounted to the platform 150, the side portion of the rod and reel member 130 defines the left side of switch mounting bracket 34, thereby forming a generally U-shape saddle for receiving the electrical switch 32 therein.

The elongated lever arm 36 is pivotally connected by a pivot pin 38 to the forward portion of the switch mounting bracket 34 and actuates the electrical switch 32. The switch mounting bracket 34 is configured so that the electrical switch 32 extends partially through the bottom of the switch mounting bracket, whereupon the elongated lever arm 36 operatively engages the actuating portion of the electrical switch 32 as the elongated lever arm 36 is pivotally moved in an upwardly direction towards the elongated handle 40.

The upper portion of the rod and reel member 140 is recessed to define a recessed cavity 142, which is configured to supportively hold the fishing reel 12 therein. The fishing reel 12 is partially disposed within the recessed cavity 142, so that the forward leg 142 of the fishing reel is slidably received and held within a slotted portion 144 of the recessed wall 142.

A reel hold down bracket 160 is positioned adjacent to the rearward leg 16 of the fishing reel 12 and holds the fishing reel 12 to the rod and reel member 140 by a fastener 162, which is secure to internally threaded hole 148. The fastener 162 is generally a bolt or screw, or alternatively, a rivet, pin, dowel, or key. Preferably, the fastener 162 is bolt.

The spool shaft adaptor 80 is connected to the spool shaft 14 and extends co-axially thereof. The second gear 78 is connected to the spool shaft adaptor 80 and extends radial from the spool shaft adaptor 80. The second gear 78 is operatively coupled to the first gear 74. The first gear 74 extends axially from the drive train 76, which is disposed within the gear housing 90. The drive train 76 and first gear 74 are adjusted into alignment with second gear 78 by loosening the fasteners, which mount the gear housing to the platform 150 and moving the gear housing 90 along adjustment holes 154 until first and second gears 74 and 78 are in meshing engagement with each for rotation movement thereof.

As illustrated in FIGS. 5A–5D, the rod and reel member 140 and the mounting member 150 that extends perpendicularly from the right side of rod and reel member 140 define the support housing 130. The rod and reel member 140 has a generally cylindrical shape with the right side portion having a relatively flat face. The mounting member 150 is a generally rectangular or squire shape. The adjustment holes 154 extend through the mounting member 150 and are generally oval or oblong shaped. The holes 28 have internal threads for mounting fasteners, such as bolts or screws thereto. Preferably, the fasteners used are cap head bolts or screws. Hole 148 has internal threads for mounting the hold down bolt 162 thereto. Sleeve 146 is configured to slidably receive the fishing rod 20 therein, wherein the fishing rod 20 is joined to sleeve 146 by a bonding agent, adhesive, epoxy, or glue.

Figure 4:
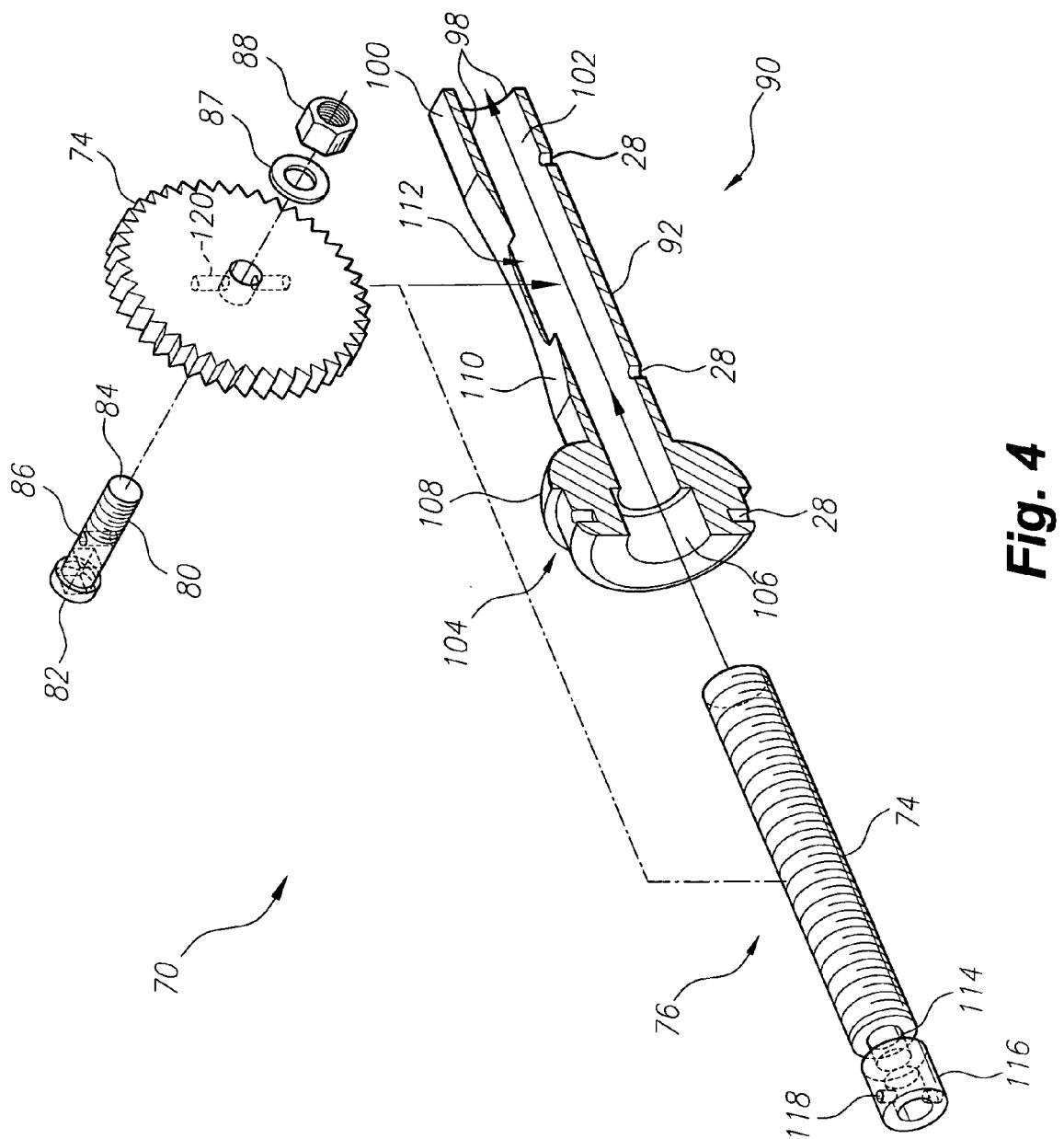
FIG. 4 is a partial cut away view of the gear housing and gear assembly of the motorized fishing reel actuating mechanism and rod assembly according to the present invention.
Figure 5A:
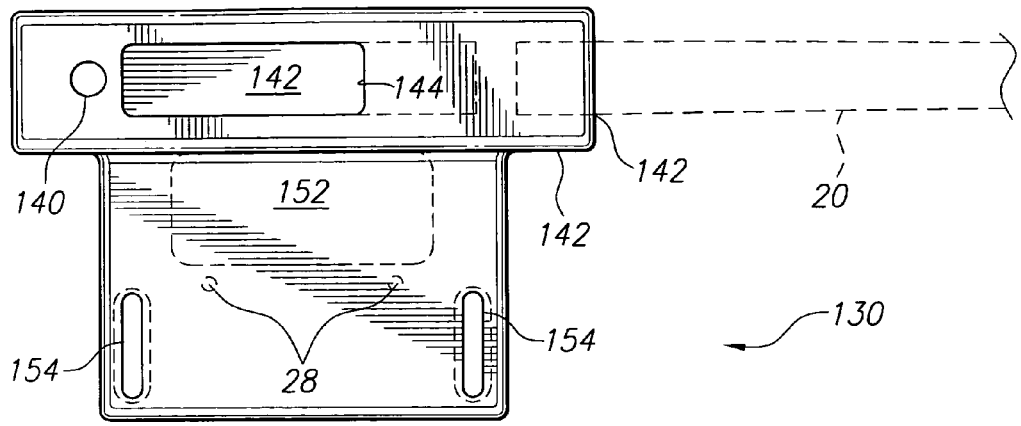
FIGS. 5A, 5B, 5C and 5D make up a view of the supporting housing of the motorized fishing reel actuating mechanism and rod assembly according to the present invention.
Figure 5B:
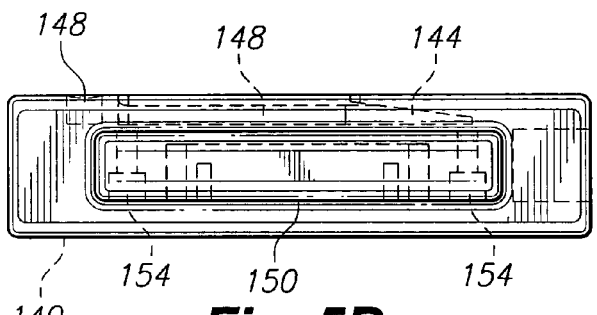
Figure 5D:
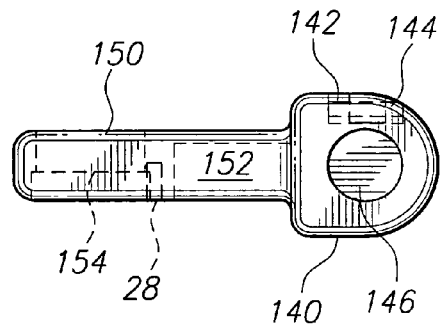
Figure 5C:
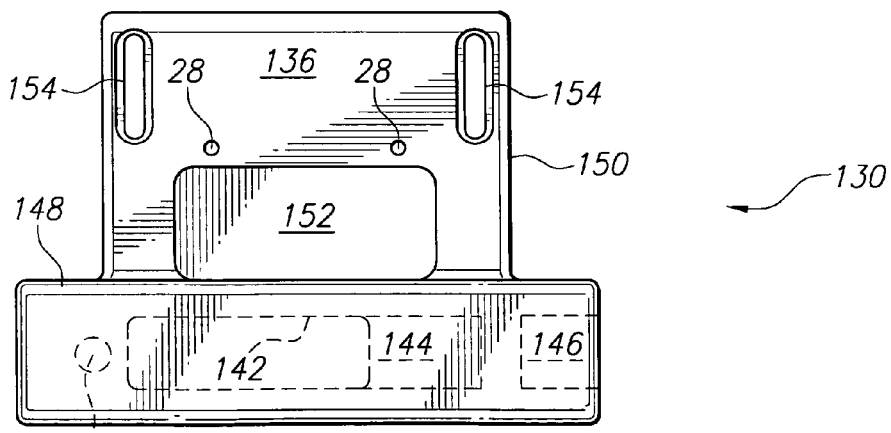

As shown in FIG. 4, the gear assembly 70 includes a gear housing 90 having a support wall 92 with an exterior and interior surfaces 98 and 100, respectively. The interior surface 98 of the support wall 92 defines a central bore, axial passageway, or generally cylindrical chamber 102, having opposing first and second end openings 94 and 96. The upper portion of the support wall 92 has a beveled, tapered, or recessed opening 112, which is configured to receive a portion of the second gear 78 therein. The exterior surface 100 slopes toward the recessed opening 112 to define a beveled, sloped, or tapered face 110. The left side portion of the support wall 92 has a relatively flat exterior surface.

The support wall 90 has a coupling 104, which is integrally connected to the gear housing 90 and is configure to fit within the second end portion 44 of the elongated handle 40. The coupling 104 includes a flange or collar 108, which abuts the second end portion 44 of the elongated handle 40. The coupling 104 has a central bore 106 that extends axially from the first end opening 94 of the cylindrical chamber 102, so that the drive train 76 can extend axially from the motor shaft 52 into the gear housing 90. The bottom portion of the coupling 104 has a generally U-shape opening, slot, groove, or channel, which defines a passageway for the electrical wires 66 to pass through from the electrical switch 32 into the elongated handle 40.

The coupling 104 has two internally threaded holes 28, which are configured and positioned to align with countersink holes 48 on the elongate handle 40 when the coupling 104 is inserted into the second end portion 44 of the elongated handle 40. The gear housing 90 is removably connected to the elongated handle 40 by fasteners, which are inserted into holes 48 and secured to the internally threaded holes 28. The fasteners can be bolts or screws. Preferably, the fasteners are cap head screws or bolts. Alternatively, the fasteners can be rivets, pins, dowels, or keys.

The drive train 76 includes a coupling 116 and a drive shaft 114, which extend axially within the cylindrical chamber 102 of the gear housing 90. The coupling is press fitted on the motor shaft 52. A pin, key, or set screw 118 secures the coupling to the motor shaft 52. The gear assembly 70 includes a first gear 74, which is integrally connected to the drive shaft 114 and extends co-axially within the cylindrical chamber 102 of the gear housing 90. The drive shaft 114 is orientated in a generally perpendicular axial relation with respect to the spool shaft adaptor 80, so that the first gear 74 meshes with the second gear 78. Preferably, the first gear 74 is a worm gear. Alternatively, a crown gear can be press fitted onto the drive shaft 114 to engage gear 78.

The spool shaft adaptor 80 has a first end portion, which defines a hole 82 having internal threads for mounting to the spool shaft 14 of the fishing reel 12. The threaded hole 82 is configured and adapted to removably connect to any type of fishing reel 12. The spool shaft adaptor 80 also has a threaded second end portion 84. A through hole 86 is configured to receive a pin or set screw 120. Second gear 78 is connected to the spool shaft adaptor 80 by pin 120, which is inserted into through hole 86 of the spool shaft adaptor. Alternatively, a key and keyway can be used to secure the second gear 78 to the spool shaft adaptor 80. Preferably, second gear 78 is a helix gear. Advantageously, any type of associated fishing reel can be use by changing the spool shaft adaptor 80, which can be a plurality of spool shaft adaptors having different threaded holes 82 for fastening to different types of fishing reels.

A washer 87 is position adjacent to the second gear 78 and a nut 88 is threaded onto the thread portion of the spool shaft adaptor 80. The second gear 78 is positioned in the recessed opening 112, so that the teeth of second gear 78 meshes with the worm gear 74, wherein rotation of the worm gear 74 rotates the gear 78, which winds the fishing line 22 onto the fishing line spool of the fishing reel 12.

Figure 7:
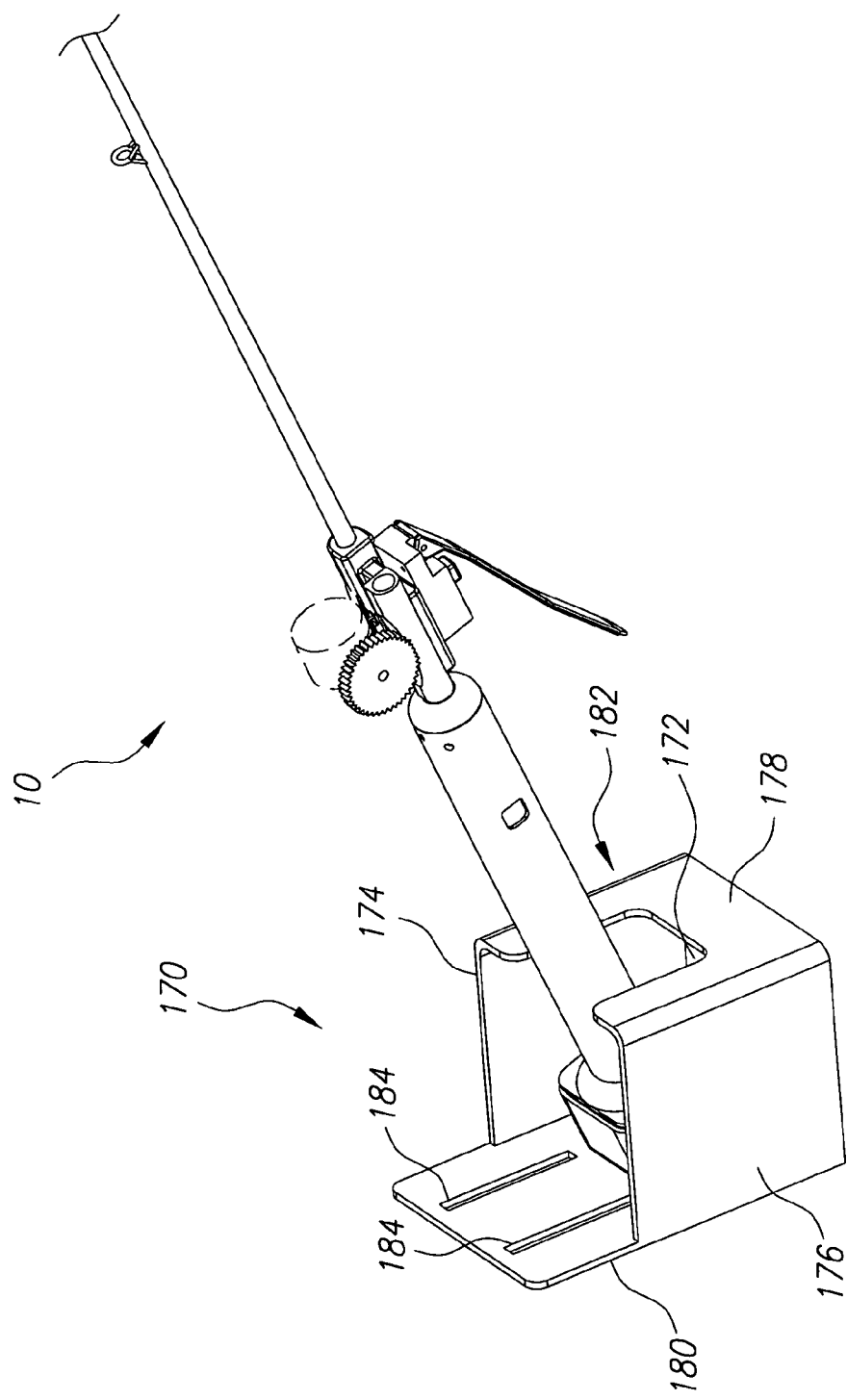
FIG. 7 is a perspective view of a holder for the motorized fishing reel actuating mechanism and rod assembly according to the present invention.

As shown in FIG. 7, a fishing rod holder 170 is configured to hold the base of the fishing pole, which is defined by the battery 60 and the first end portion 42 of the elongated handle 40. The fishing rod holder 170 includes a bottom wall 172, opposing front and back walls 178 and 180 that extend from opposing edge portions of the base 172, and opposing right and left side walls that extend from opposing side edge portion of the base 172 to define a cup or saddle 182 for holding the base of the fishing pole. A portion of the front wall 178 has a generally U-shape or V-shape configuration for supportively holding the first end portion 42 of the elongated handle 40. The back wall 180 includes two slots or belt loops 184, which are configured to slidably receive a belt (not shown) therein.

It is to be understood that the present invention is not limited to the embodiments described above, but encompasses any and all embodiments within the scope of the following claims.

I claim:

1. A motorized fishing reel actuating mechanism and rod assembly for selectively actuating an associated fishing reel, comprising:
   a support housing having a rod and reel member for mounting fishing reel thereon, and a mounting member integrally connected to and extending perpendicularly from a side portion of said rod and reel member;
   a fishing rod extending forwardly from said support housing;
   an elongated handle having a periphery wall with opposing first and second end portions, the periphery wall defining a generally cylindrical chamber therein;
   an electrical motor disposed inside said elongated handle;
   a power source for said electrical motor;
   a drive train operatively coupled to said electrical motor;
   a gear assembly operatively coupled to said drive train and the fishing reel for winding a fishing line thereupon; and
   a switch assembly having a variable control mechanism and an elongated lever arm pivotally connected to said switch assembly, the variable control mechanism in electrical communication with said power source and said electrical motor for varying the speed of the electrical motor, said variable control mechanism being operatively engage and disengage by said elongated lever;
   wherein said electrical motor rotates said gear assembly, and rotation of said gear assembly operatively rotates a spool of the fishing reel for winding a fishing line thereon.

2. The motorized fishing reel actuating mechanism and rod assembly according to claim 1, wherein said gear assembly includes a spool shaft adaptor having a through hole, a first end portion, and a threaded second end portion, the first end portion defining a hole having internal threads for mounting to spool shaft of the fishing reel.

3. The motorized fishing reel actuating mechanism and rod assembly according to claim 2, wherein said gear assembly includes a first gear and a second gear, said first gear connected to said drive train, said second gear connected to said spool shaft adaptor, said first gear meshes with said second gear for rotation thereof.

4. The motorized fishing reel actuating mechanism and rod assembly according to claim 3, wherein said drive train includes a drive shaft orientated in a generally perpendicular axial relation with respect to said spool shaft adaptor, so that said first gear meshes with said second gear.

5. The motorized fishing reel actuating mechanism and rod assembly according to claim 1, wherein said power source is a rechargeable battery, said rechargeable batter removably mounted to the first end portion of said elongated handle.

6. The motorized fishing reel actuating mechanism and rod assembly according to claim 1, wherein said gear assembly includes a gear housing having a support wall with exterior and interior surfaces, the interior surface of said support wall defining a generally cylindrical chamber having opposing first and second end openings, said gear housing having a recessed opening disposed in upper portion of the support wall, said recessed opening configured to receive a portion of said second gear therein for meshing engagement with a first gear, which extends axially from said drive train.

7. The motorized fishing reel actuating mechanism and rod assembly according to claim 6, wherein said gear housing has a coupling configured to fit within the second end portion of said elongated handle, said coupling having a central bore, which extends axially from the first end opening of said cylindrical chamber.

8. The motorized fishing reel actuating mechanism and rod assembly according to claim 7, wherein said drive train extends axially inside said gear housing, said drive train having a drive shaft and a worm gear integrally connected said drive shaft.

9. A motorized fishing reel actuating mechanism and rod assembly for selectively actuating an associated fishing reel, comprising:
   a rod and reel member for mounting a fishing reel thereon;
   a mounting member integrally connected to and extending perpendicularly from a side portion of said rod and reel member for mounting a gear housing thereon;
   an elongated handle having a periphery wall with opposing first and second end portions, the periphery wall defining a generally cylindrical chamber therein;
   an electrical motor having a motor shaft and a motor mounting plate, the motor mounting plate mounts said electrical motor inside the second end portion of said elongated handle;
   a power source disposed in the first end portion of said elongated handle, said power source operatively coupled to said electrical motor;
   a gear housing having a support wall with exterior and interior surfaces, the interior surface of said support wall defining a generally cylindrical chamber having opposing first and second end openings, said gear housing having a beveled opening disposed in upper portion of the support wall;
   a drive train extending axially inside said gear housing, said drive train having a drive shaft with a coupling integrally connected at one end of said drive shaft, said coupling being press-fitted onto motor shaft of said electrical motor;
   a gear assembly having a first gear and a second gear, said first gear connected to said drive shaft and extending co-axially inside said cylindrical chamber of said gear housing, said second gear partially fitting within said beveled opening of said gear housing for meshing engagement with said first gear, said second gear being operatively coupled to an associated fishing reel for winding of a fishing line onto the associated fishing reel;

an electrical switch interposed between and in electrical communication with said power source and said electrical motor for varying the speed of the electrical motor;

a switch mounting bracket for mounting said electrical switch to bottom portion of said mounting member; and an elongated lever arm pivotally connected to said switch mounting bracket for actuating said electrical switch.

10. The motorized fishing reel actuating mechanism and rod assembly according to claim 9, said mounting member is a platform having a generally rectangular shape, said platform having a recessed cavity for receiving a portion of said electrical switch therein.

11. The motorized fishing reel actuating mechanism and rod assembly according to claim 10, wherein said switch mounting bracket has a generally L-shape configuration and is mounted to bottom of said platform, wherein said switch mounting bracket and side portion of said rod and reel member defining a generally U-shaped saddle for receiving said electrical switch therein.

12. The motorized fishing reel actuating mechanism and rod assembly according to claim 11, wherein said electrical switch extends partially through the bottom of said switch mounting bracket, whereupon said elongated lever arm operatively engages actuating portion of said electrical switch.

13. The motorized fishing reel actuating mechanism and rod assembly according to claim 9, wherein a spool shaft adaptor is connected to spool shaft of the associated fishing reel and extends co-axially thereof.

14. The motorized fishing reel actuating mechanism and rod assembly according to claim 13, wherein said second gear is connected to said spool shaft adaptor and extends radially from said spool shaft adaptor.

15. The motorized fishing reel actuating mechanism and rod assembly according to claim 9, wherein an upper portion of said rod and reel member is a recessed to define a recessed cavity, said recessed cavity configured to supportively hold the associated fishing reel therein.

16. The motorized fishing reel actuating mechanism and rod assembly according to claim 15, wherein said recessed cavity includes a slot, said slot slidably receives a forward leg of the associated fishing reel.

17. The motorized fishing reel actuating mechanism and rod assembly according to claim 16, further comprising a reel hold down bracket positioned adjacent to a rearward leg portion of the associated fishing reel for holding the associated fishing reel inside said recessed cavity of said rod and reel member, said hold down bracket secured to said rod and reel member by a fastener.

18. The motorized fishing reel actuating mechanism and rod assembly according to claim 9, wherein said rod and reel assembly includes a sleeve for joining a fishing rod therein.

19. A motorized fishing reel actuating mechanism and rod assembly for selectively actuating an associated fishing reel, comprising:

a support housing having rod and reel member and a mounting member integrally connected to and extending perpendicularly from a side portion of said rod and reel member for mounting a gear housing thereon, said rod and reel member having a sleeve configured to slidably receive a fishing rod;

a fishing rod joined to said sleeve and extending forwardly from said support housing;

a gear housing having a support wall with exterior and interior surfaces, the interior surface of said support wall defining a generally cylindrical chamber having opposing first and second end openings, said gear housing having a tapered opening disposed in upper portion of the support wall, said gear housing removably mounted to upper portion of said mounting member and position adjacent to said rod and reel member;

a coupling having an central bore and a flange, said coupling integrally connected to first end portion of said gear housing, said coupling being configured to fit within an elongated handle, so that the flange abuts said elongated handle;

an elongated handle having a periphery wall with opposing first and second end portions, the periphery wall defining a generally cylindrical chamber therein, said elongated handle mounted to said coupling of said gear housing and extending rearwardly from said support housing in a generally offset position with respect to said fishing rod;

an electrical motor having a motor shaft mounted inside the second end portion of said elongated handle;

a battery disposed in the first end portion of said elongated handle, said battery operatively coupled to said electrical motor;

a drive train extending axially inside said gear housing, said drive being operatively coupled to said electrical motor;

a gear assembly having a first gear and a second gear, said first gear connected to said drive train and extending co-axially inside said cylindrical chamber of said gear housing, said second gear partially fitting within said tapered opening of said gear housing for meshing engagement with said first gear;

a spool shaft adaptor configured for mounting to a spool shaft of an associated fishing reel, said spool shaft adaptor connected to said second gear, wherein said second gear is operatively coupled to the associated fishing reel;

an electrical switch interposed between and in electrical communication with said battery and said electrical motor for varying the speed of the electrical motor;

a switch mounting bracket for mounting said electrical switch to bottom portion of said mounting member; and an elongated lever arm pivotally connected to said switch mounting bracket for actuating said electrical switch.

20. The motorized fishing reel actuating mechanism and rod assembly according to claim 19, further comprising a belt holder configured to supportively hold said elongated handle therein.

* * * * *